April 5, 1960     E. D. BOUTWELL     2,931,448
VEHICLE PARKING APPARATUS

Filed March 12, 1956     5 Sheets-Sheet 1

*INVENTOR.*
ERNEST D. BOUTWELL
BY
*Harman & Harman*
ATTORNEYS

April 5, 1960 E. D. BOUTWELL 2,931,448
VEHICLE PARKING APPARATUS
Filed March 12, 1956 5 Sheets-Sheet 2
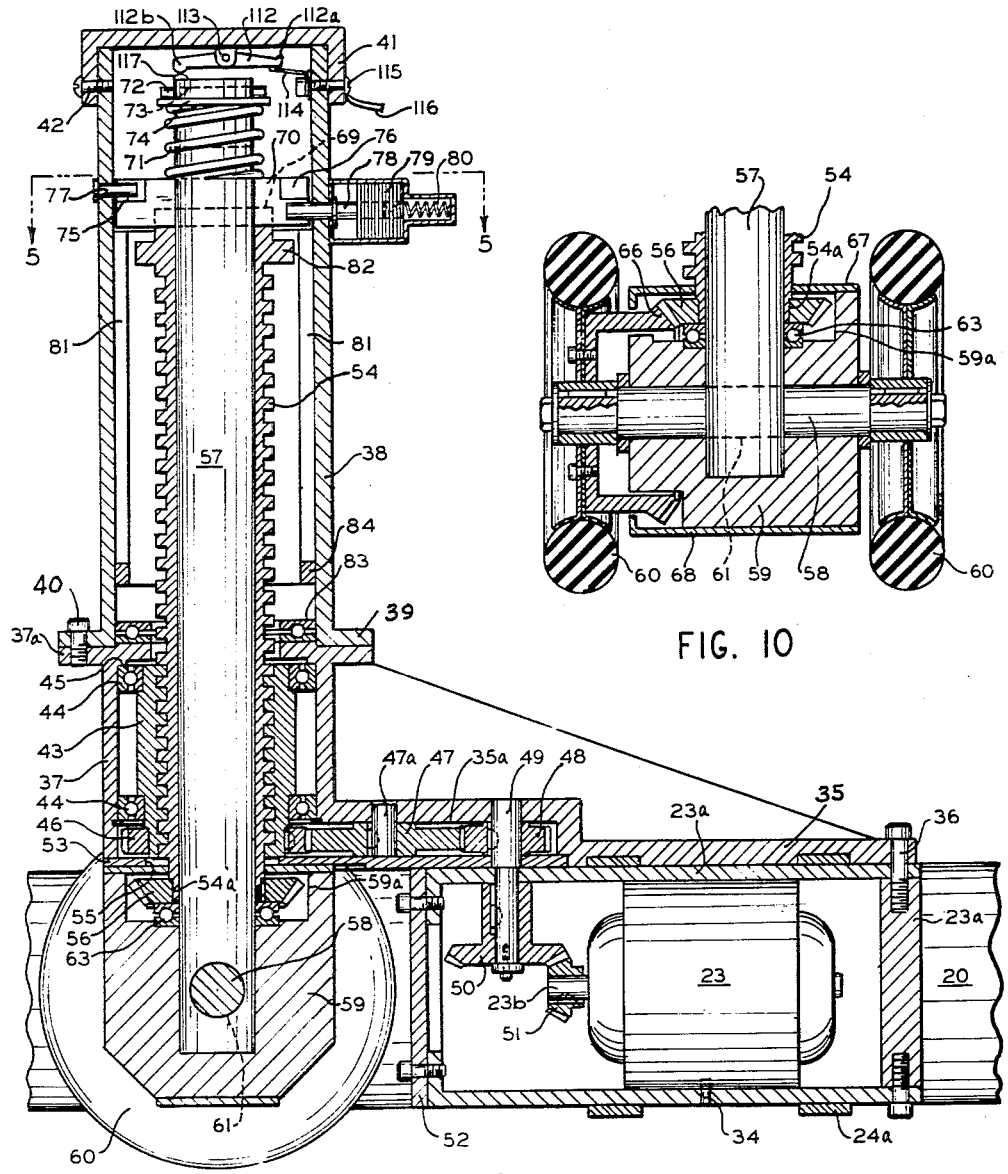
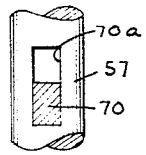
FIG. 15
INVENTOR.
ERNEST D. BOUTWELL
BY
*Fearman & Fearman*
ATTORNEYS April 5, 1960 E. D. BOUTWELL 2,931,448
VEHICLE PARKING APPARATUS
Filed March 12, 1956 5 Sheets-Sheet 3
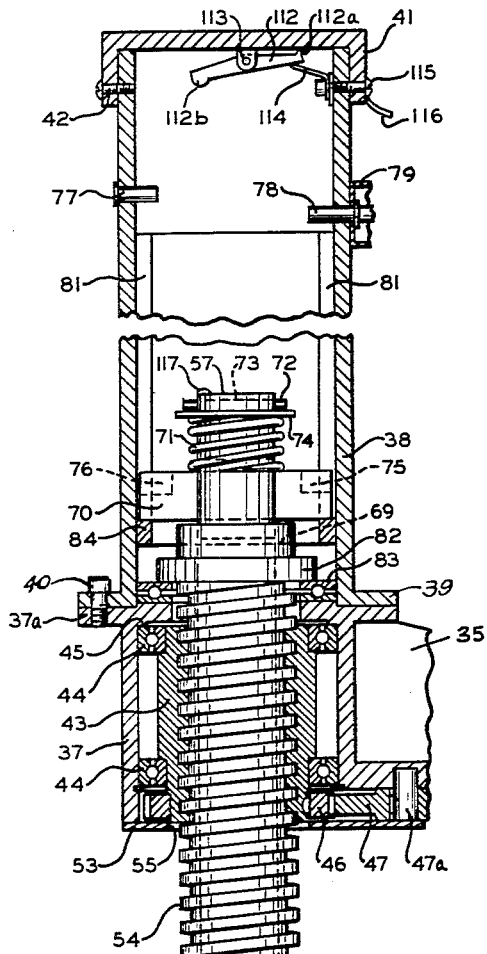
FIG. 4
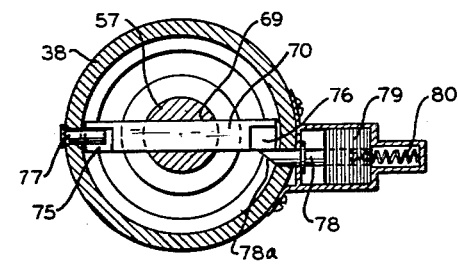
FIG. 5
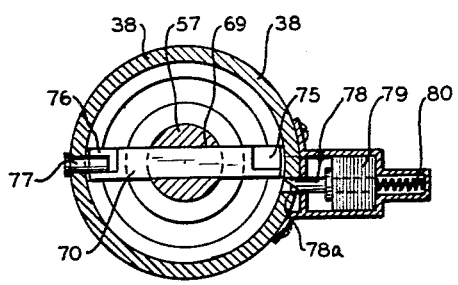
FIG. 6
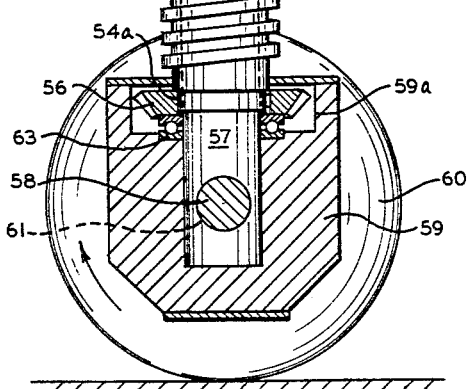
INVENTOR.
ERNEST D. BOUTWELL
BY
*Harman & Harman*
ATTORNEYS April 5, 1960 E. D. BOUTWELL 2,931,448
VEHICLE PARKING APPARATUS
Filed March 12, 1956 5 Sheets-Sheet 4

INVENTOR.
ERNEST D. BOUTWELL
BY
*Hearman & Hearman*
ATTORNEYS

April 5, 1960   E. D. BOUTWELL   2,931,448
VEHICLE PARKING APPARATUS
Filed March 12, 1956   5 Sheets-Sheet 5

*INVENTOR.*
ERNEST D. BOUTWELL
BY
*Fearman & Fearman*
ATTORNEYS

United States Patent Office 2,931,448
Patented Apr. 5, 1960

2,931,448

VEHICLE PARKING APPARATUS

Ernest D. Boutwell, Saginaw, Mich.

Application March 12, 1956, Serial No. 570,797

7 Claims. (Cl. 180—1)

My invention relates broadly to vehicles and more particularly to parking attachments for vehicles for facilitating the parking of vehicles.

One of the objects of my invention is to provide a parking attachment of compact construction for vehicles wherein a motor device may be selectively actuated for moving a jack into position for engaging the roadbed and elevating the rear wheels of the vehicle and thereafter utilized to drive parking wheels for orienting the vehicle into a parking position.

Another object of my invention is to provide a motor operated jack attachable to positions on the rear axle of a vehicle adjacent the traction wheels thereof, the jacks including parking wheels which may be driven to orient the vehicle into parking position.

A further object of my invention is to provide a vehicle parking device comprising a jack and power-operated wheels where both the jack and the power-operated wheels are driven from the same motor which operates throughout one portion of its cycle to lower or raise the jack and throughout another portion of its cycle to impart a driving force to the wheel for orienting the vehicle into or out of parking position.

Still another object of my invention is to provide a power-operated jack unit for motor vehicles which may be attached to the vehicle axle adjacent each rear wheel thereof and which includes a driving motor and mechanism for raising and lowering the power-operated jack unit and imparting movement to parking wheels journalled on the jack where such movement may be directively controlled for facilitating parking in either a right or left hand position.

Another object of my invention is to provide a compact parking device for vehicles which may also be used as a power jack for facilitating the changing of tires when necessary.

Other and further objects of my invention reside in an improved parking mechanism adaptable for a wide variety of makes of different cars, which increases convenience in parking and makes possible the accommodation of cars in small available spaces for purposes of parking as set forth more fully in the specifications hereinafter following by reference to the accompanying drawings in which:

Fig. 3 is a vertical sectional view through the power-operated jack of my invention, the jack being shown in elevated position;

Fig. 4 is a view similar to the view illustrated in Fig. 3 showing the screw jack in down position;

Fig. 5 is a transverse sectional view taken on line 5—5 of Fig. 3;

Fig. 6 is a similar transverse sectional view showing the solenoid detent withdrawn and the key revolved 180°.

Fig. 10 is a fragmentary, transverse, sectional view of one of the parking attachments of my invention illustrating the manner in which the wheels on the lower end of the jack are driven;

Figure 15 is a sectional view taken on the longitudinal axis of the wheel mounting shaft illustrating the manner in which it carries a key member when the key member couples the shaft and jack as in Figure 3.

Figure 1:
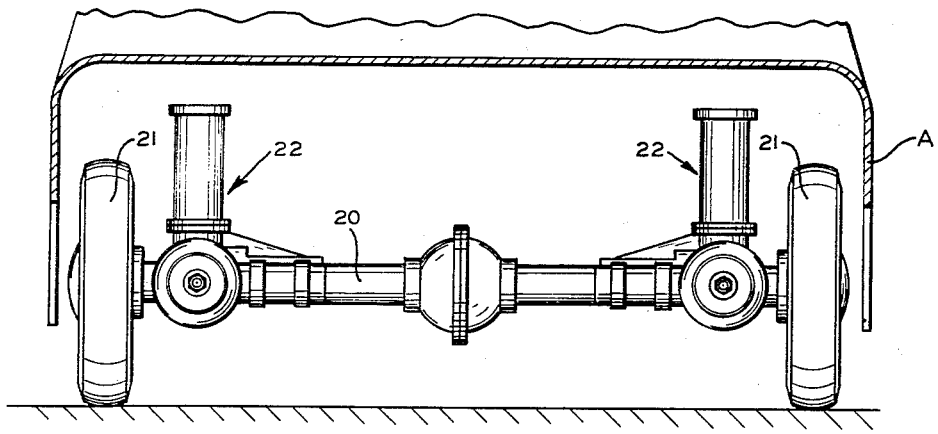
Fig. 1 is a rear view of a vehicle in fragmentary transverse section showing the parking attachments in accordance with my invention applied to the rear axle of the vehicle with the power operated jacks in raised or elevated positions.
Figure 2:
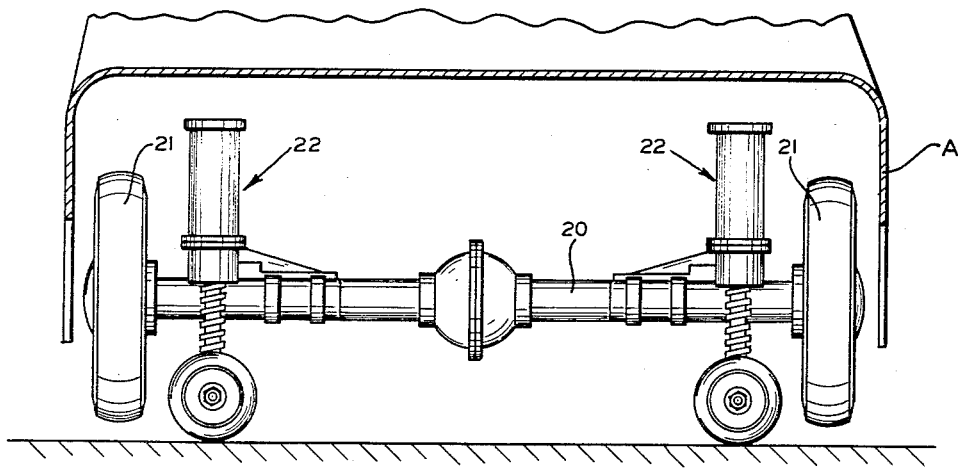
Fig. 2 is a view similar to the view shown in Fig. 1 but showing the power-operated jacks lowered to a position for raising the vehicle above the ground level for operation of the parking wheels.

Referring now more particularly to the accompanying drawings in which I have illustrated a preferred embodiment of the invention a letter A (Figs. 1 and 2) generally indicates the body of any conventional automobile or automotive vehicle which is broken away in Figs. 1 and 2 to expose the rear axle 20 and the wheels 21 thereon. Supported on the axle 20 adjacent the rear wheel 21 are parking wheel units 22 which are adapted to raise the rear end of a vehicle off the ground and move it laterally in a manner which will be presently described.

Figure 8:
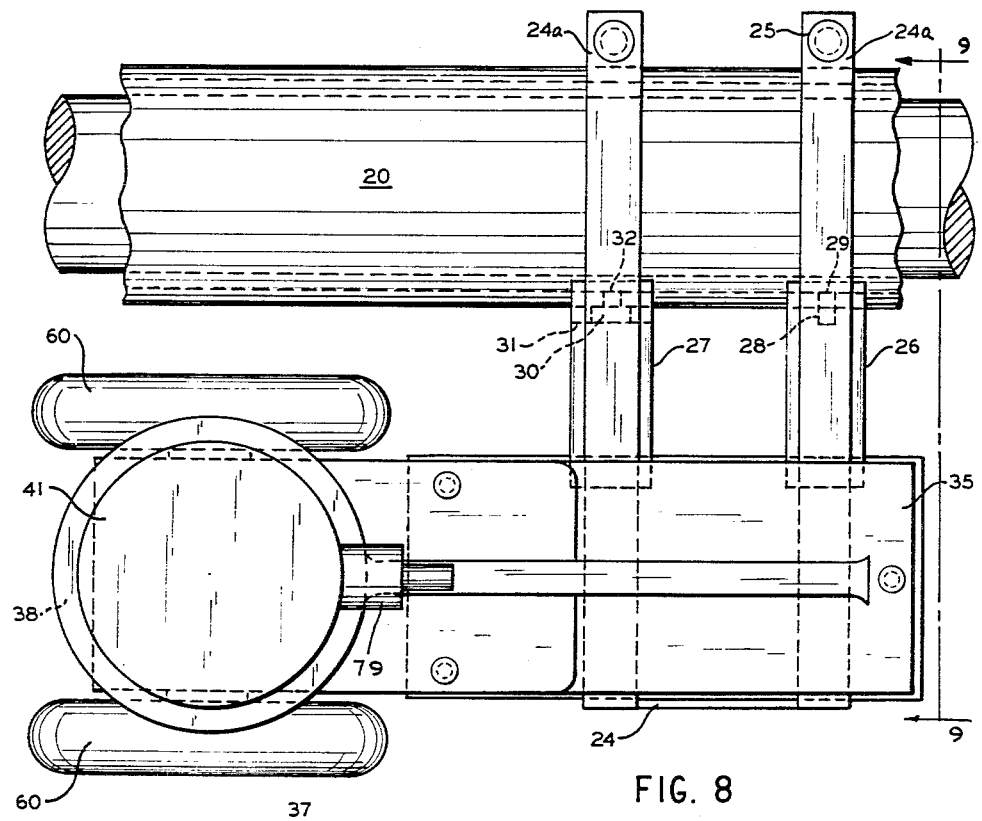
Fig. 8 is a fragmentary plan view of the rear axle of a vehicle showing one of the parking devices of my invention mounted in position.
Figure 9:
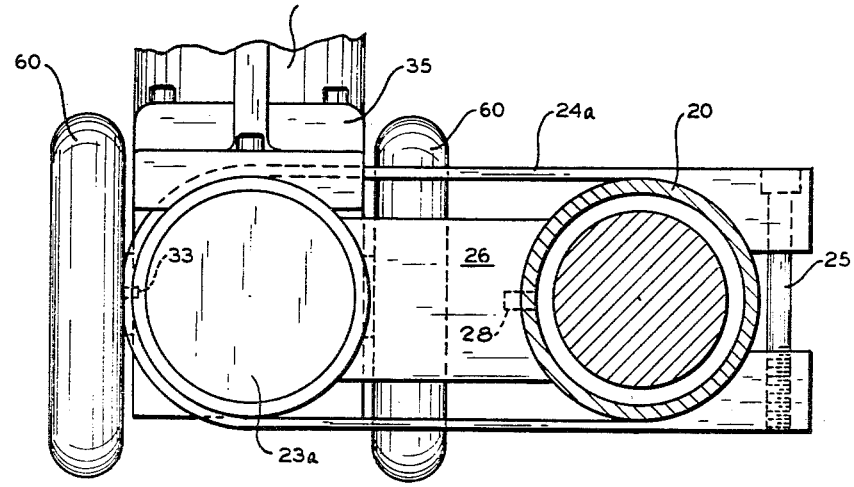
Fig. 9 is a sectional view taken on the line 9—9 of Figure 8 illustrating the manner in which a parking attachment unit is clamped to the axle.
Figure 11:
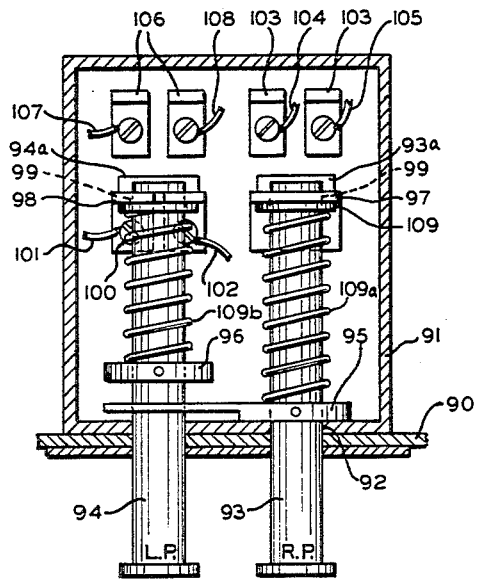
Fig. 11 is a sectional plan view through the control unit on the vehicle dashboard for operating the control circuits of the invention.
Figure 12:
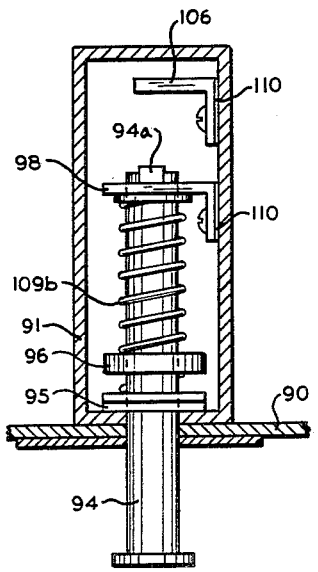
Fig. 12 is a sectional elevational view through the control.

In the preferred embodiment which is shown in the drawings each unit 22 carries its own motor 23 which is mounted within a motor housing 23a supported on the axle 20 by an integrated U-shaped clamp 24 (Figs. 8 and 9). Since each unit 22 is of identical construction a description of one of the units will suffice.

The arms 24a of the clamp 24 are bolted as at 25 and spacers 26 and 27 are provided between the motor 23 and axle 20. A pin 28 carried by the spacer 26 seats in an opening 29 in the axle 20 and a square headed bolt 30 closely fits in a slot 31 provided in spacer 27 and similarly enters an opening 32 in the axle 20. The slot 31 is provided so that it will not be necessary to exactly locate the openings or holes in the spacer and axle which would be a difficult task. The purpose of the pin 28 and bolt 31 is, of course, to prevent twisting of the clamp 24 relative to the axle and to rigidly secure the motor in position. Pins 33 on the clamp 24 similarly enter the motor housing to prevent the motor housing from twisting in the clamp and the motor 23 can also be pinned as at 34 (Fig. 3) in the housing 23a.

A bracket 35 can be bolted to the housing 23a as at 36 to support the unit 22 and the bracket may be provided with a tubular section 37 having a bolting flange 37a. The screw housing 38 of the unit 22 has a similar flange 39 which can be bolted to the flange 37a as at 40. A cap 41 is secured on the upper end of the screw housing 38 by machine screws 42.

Provided within the tubular section or socket 37 of the brackets 35 is a revolvable sleeve 43 (Fig. 3) which is driven from the motor 23 in a manner which will be presently described. Annular ball bearing members 44 permit free rotation of the sleeve 43 within the bearings and an internal shoulder 45 provided on the section 37 prevents movement of the sleeve 43 upwardly in an axial direction.

The sleeve 43 has a gear 46 keyed thereon and it will be seen that the bracket 35 is recessed to provide a gear housing section 35a. Housed within the section 35a is a gear 47 in mesh with the teeth 46 and a gear 48 in mesh with the gear 47, the gear 47 being keyed on stub shaft 47a and the gear 48 on a shaft 49 which extends into the motor housing 23a underneath. The shaft 49 is driven by a bevel gear 50 which is in mesh with a bevel gear 51 fixed on the armature shaft 23b of the motor 23. A cover 52 is provided for the outer end of the motor housing 23a and the housing 23a has an exension plate 53 which protects the gears 50 and 51 and provides a rigid support preventing axial movement of the sleeve 43 downwardly.

A tubular jack screw 54 is received within the internally threaded sleeve 43 for movement axially therein and an opening 55 of sufficient diameter to pass the screw 54 is provided in the extension plate 53 to permit the jack screw 54 to move axially downwardly. The lower end of the screw 54 is reduced as at 54a and a gear 56 is keyed thereon as shown for a purpose which will soon become apparent. Within the screw 54 is a shaft 57 which is in diameter slightly less than the internal diameter of the jack screw 54 to provide a clearance of several thousandths of an inch for rotation. A pin 58 which supports a wheel block 59, on either side of which is a parking wheel 60, extends through an opening 61 in the lower end of the shaft 57. The block 59 is recessed as at 59a to receive the lower end of the jack screw 54 and shaft 57, and a thrust bearing 63 is provided in the block to support the end of the screw and gear 56.

Thus, while the end of jack screw 54 can revolve freely in the block 59 which supports it, the block 59 and parking wheels 60 are pinned to the shaft 57. A ring gear 66 (Fig. 10) in mesh with the gear teeth 56 on the jack screw is mounted on the inner face of one of the parking wheels 60 for revolving the wheels 60 and since the wheels 60 are keyed to their axle or pin 58 only one gear 66 need be provided in each unit. Plainly, when the jack screw 54 has lowered the parking wheels into ground engaging position, the teeth 56 will revolve the wheels 60 so that they move in to the curb or away therefrom as desired. Cover plates 67 and 68 which do not interfere with rotation of the gear 66 and wheels 60 may be bolted to the block 59 as shown.

The upper end of the jack screw 54 is transversely slotted or grooved as at 69 (Fig. 3) to receive a key or guide 70 carried by shaft 57 and a spring 71 on the upper end of the shaft 57 tends to retain the guide 70 in the slot. The key 70 passes through a slot 70a in the shaft 57 which is of sufficient depth to permit key 70 to be lifted out of groove 69 (see Fig. 4). A pin 72 extending through an opening 73 in the shaft has a washer 74 in engagement therewith for holding the spring 71. At each end the guide 70 is notched or recessed as at 75 and 76 and a stop pin 77 extending through the wall of the screw housing 38 has engagement in the recessed portions to limit rotation of the guide 70 to half a revolution. On the side of the housing 38 opposite the pin 77 a solenoid plunger 78 normally prevents the limited rotation permitted by pin 77, however when the solenoid 79 is energized the plunger 78 will be withdrawn out of the path of the guide 70. The plunger 78 has an inclined cam face 78a thereon for a purpose which will later become apparent and is spring-returned by a spring 80 when the solenoid 79 is deenergized.

The plunger 78 is withdrawn initially when the left park button is pressed, as will be described, to permit the sleeve 43 to first rotate the jack screw 54 and shaft 57 through half a revolution to properly orient the parking wheels 60. Thereafter the pin 77 prevents further rotation of shaft 57 and continued rotation of sleeve 43 moves the jack screw 54 axially downwardly. Channel tracks 81 or the like are provided on the interior wall of the screw housing 38 to receive the ends of the guide 70 as the jack 54, and accordingly the shaft 57 and guide 70, descend. The tracks 81 may, of course, be cut in the wall of the housing and the method of their formation is unimportant to the invention. The purpose of the tracks 81 is to prevent rotation of the shaft 57 and screw 54 after the guide 70 descends below the pin 77.

The upper end of jack screw 54 has a shoulder 82 provided thereon and when the jack screw 54 has descended the predetermined distance necessary to lift the rear wheels 21 of the vehicle off the ground the shoulder 82 comes into engagement with a thrust bearing 83 which may be press fitted in the housing 38 as shown to prevent further axial descent of the screw 54. Continued rotation of sleeve 43 will revolve jack screw 54 however and parking drive wheels 60 through the gear 66 since stop 84 lifts key 70.

Figure 7:
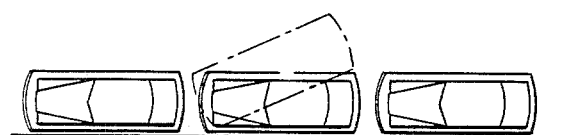
Fig. 7 is a schematic view illsutrating the mode of operation of the vehicle parking apparatus of my invention.

In the operation of the parking units the vehicle turns into a parking space between two cars as demonstrated by the broken lines in Fig. 7. With a parker unit 22 adjacent both rear wheels inward of the leaf spring suspension systems on the rear axle the driver now actuates a control system, which will later be described in detail, to operate the units 22 so that they raise the rear wheels off the ground and swing the rear end of the car into the curb. Initially the jack screws 54 and parking wheels 60 will, of course, be in up position after having been returned following their most recent use. Attention is directed to Fig. 5 in which the guide 70 is shown locked in position by the plunger 78. In this position it will be assumed that the jack screw 54 must be revolved in a clockwise direction (Fig. 3) in order to descend and the parking wheels 60 if they were to be driven by the gear 66 would revolve in a clockwise direction as viewed in Fig. 3 so that the rear end of the vehicle would be moved toward the curb which is assumed to be at the right in Fig. 3.

When the driver actuates the control system to commence the parking operation, the sleeve 43 of each unit through its motor 23 would revolve the associated jack screw 54 except that the screw is prevented from revolving by the plunger 78 and accordingly the jack screw 54 is moved axially downwardly. The wheels 60 are lowered sufficiently to raise the rear wheels of the vehicle off the ground before the descent of the jacks 54 is stopped by the thrust bearing 83 in the jack housings 38. Stops 84 are so positioned in the channel 81 that after the jack screws 54 have commenced to lift the wheels 21 of the vehicle off the ground the guides 70 were lifted from the slots 69 in the upper ends of the screws 54. Continued rotation of the sleeves 43 then revolves the screws 54 and drives the parking wheels 60 through the gears 66 until the rear end of the vehicle is swung over into position against the curb. The function of the stops 84 in the channels 81 is, as noted, to lift the guides 70 so that they will no longer prevent the screws 54 from rotating once the rear wheels of the vehicle have been raised several inches off the ground.

The motors 23 are reversing motors of conventional design which are reversed by a novel control to be described, when the rear end of the vehicle is pivoted into parked position, to turn the jack screws 54 in a counterclockwise direction and move them axially upwardly to retracted position. Both units 22 are, of course, returned simultaneously in the same manner so that the vehicle rests on its wheels 21 when in parked position.

When it is desired to remove the rear end of the car from parked position the plungers 78 are first retracted by a novel control which will be later described and the jack screws 54 are revolved by the motor 23 counterclockwise through half a revolution until the guide 70 in each unit is stopped by a pin 77. Since the guides 70 are removably received in the slots 69 in screws 54 the wheels 60 are turned 180° end for end so that they are now in a position whereby the gears 56 on the jack screws 54 will drive them in a counterclockwise direction (as viewed in Fig. 3) when the jackscrews have lifted the vehicle wheels off the ground once again. Accordingly, when the stops 84 in the channels 81 again lift the guides 70 out of the slots 69 in the jackscrews 54, the screws 54 will be freed for rotating and the wheels 60 will be driven by the gears 66 to move the rear end of the vehicle outwardly to clear the vehicle behind it. Thence the motors 23 will be reversed to retract the screws 54 upwardly once again. The screws 54 are returned to the position shown in Fig. 5 since when the pins or guides 70 clear the channels 81 the pins 70 will revolve through half a revolution until the pins 77 prevent their further rotation. The plungers 78 are, of course, depressed when the guides 70 are so returning and engage their cam faces 78a. When the guides 70 come into position against the pins 77 the plungers 78 return to position to lock the guides 70 against the pins.

While I have shown units 22 only adjacent the rear wheels it is clear that units 22 could be employed adjacent each of the four wheels to move the entire vehicle laterally into parked position. Alternately units could be employed adjacent only the front wheels if desired.

Further the units can be employed to jack up the end of the car to facilitate changing of a rear tire in the embodiment shown. In using a unit to jack the car only, the motor 23 is run only sufficiently to raise the end of the vehicle off the ground. The motor will then be deenergized until the vehicle is ready to be lowered again whence it will be operated in the reverse direction.

In Figs. 11–14 I have shown a novel control for the units which is preferably mounted on the dashboard 90 of the vehicle handy to the reach of the driver. The control comprises a casing 91 provided with openings 92 in the frontwall thereof to pass a pair of control plungers 93 and 94 labeled L.P. (left park) and R.P. (right park) respectively, the left park plunger being actuated to move the vehicle to the left and the right park plunger being actuated to move the vehicle to the right. The plunger 93 has an insulated collar 95 fixed thereon and the plunger 94 has an insulated collar 96 fixed thereon and it will be seen that the collar 95 is extended and has an opening through which the plunger 94 extends and in which the plunger 94 is slidable.

Provided in the casing intermediate its ends are a pair of terminal plates 97 and 98 having openings 99 therein through which plungers 93 and 94 extend and it will be observed that the plungers have enlarged ends 93a and 94a. Terminals 100 are provided on the plate 98 from which circuit wires 101 and 102 lead however no terminals are provided on the plate 97. A pair of terminal plates 103 are provided ahead of plunger 93 however with circuit wires 104 and 105 leading therefrom and similarly a pair of terminal plates 106 are provided ahead of plunger 94 and have circuit wires 107 and 108 leading therefrom. Springs 109a and 109b mounted between insulating plates 109 on the intermediate terminal plates 97 and 98 and the collars on the plungers operate to return the plungers 93 and 94 and maintain them in the out position in which they are shown. The various terminal plates are, of course, insulated from the casing by insulative material 110.

Figure 14:
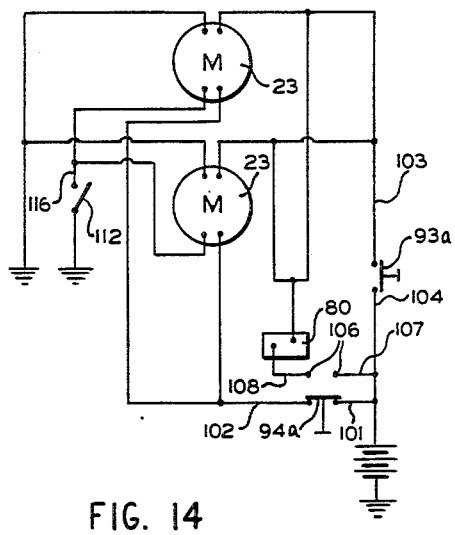
Fig. 14 is a schematic wiring diagram of the electrical control system for operating a pair of parking attachments.

The plungers 93 and 94 act merely as circuit makers and breakers and are so shown in the schematic circuit diagram which appears in Fig. 14. For the sake of convenience only, the motors 23 of the units 22 are shown as having two pairs of terminals which, when the circuits leading to them are energized, drive the motors in opposite directions. In the upper end of one of the screw casings 38 is a switch 112 (Figs. 3 and 4) which is pivoted as at 113. This switch has a contact 112a which is normally maintained in engagement with the top of the casing (which serves as a ground) by the spring 114. A terminal 115 on the casing to which circuit wire 116 leads is electrically connected to the spring 114. The shaft 57 has a projection 117 thereon which engages the end 112b of switch 112 and moves contact 112a away from the casing to break the circuit when the shaft 57 moves up to fully retracted position.

In the operation of the control system when it is desired to lower the jack screws 54 and move the rear of the automobile to the right the right park plunger 93 is pressed inwardly to close the circuit wires 104 and 105 and energize the motors 23. The wheels 60 are in position to drive clockwise as in Fig. 4. The plunger 93 is held in until the rear of the vehicle is swung to the right into parked position whence it is released. The spring 109a then returns it to position and the motors are deenergized. When the plunger 93 was pressed inwardly the collar 95 engaged the collar 96 and pushed the plunger 94 forward to a neutral position halfway between the intermediate terminal plate 98 and the plates 106. When the spring 109a returns the plunger 93 the spring 109b also returns the plunger 94 which closes the circuit wires 101 and 102 and accordingly the circuit which drives the motors in the reverse direction is energized since the switch 112 is closed with the jack screws 54 and shafts 57 in lowered position (see Fig. 4). Accordingly the motors 23 will revolve the jack screws 54 counterclockwise and retract them until the projection 117 on the one shaft 57 engages the switch 112 and breaks the circuit (Fig. 3). The vehicle will now be next to the curb in parked position. To move the rear of the vehicle outwardly to the left the left plunger 94 is pressed inwardly to close the circuit wires 107 and 108 which withdraws solenoid plungers 78 to permit the wheels 60 to be rotated end for end and energizes the motors 23 to lower the jack screws 54 once again. The plunger 94 is held forwardly until the rear of the vehicle is outward of the parked vehicle to its immediate rear and thence is released. The spring 109b returns it and since switch 112 is closed with the jack screws 54 in lowered position the wires 101 and 102 are again closed and the circuits to the motors 23 for driving the same in a direction to retract the screws are again energized. When the screws 54 are in fully retracted position the switch 112 is engaged and opened to break the circuits. This completes the parking cycle and the units are in position to be operated at a later time to assist in parking the vehicle again.

Obviously where it is desired to park on the left side of a one way street the cycle of the units 22 would be simply reversed so that the left plunger were first pushed inwardly.

Figure 13:
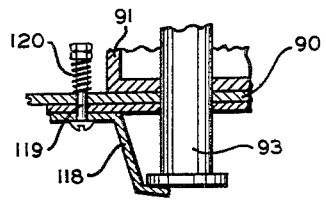
Fig. 13 is a plan view showing a clip for holding one of the control members in neutral position when using the jacks to facilitate changing of a tire.

In Fig. 13 I have shown an angular retainer strap 118 which is pivotally supported on the front of the control casing or dashboard on a post 119. A spring 120 under compression tends to pull the strap toward the dashboard. When a tire is to be changed or the like and the right plunger 93 is pressed inwardly till the jack screws 54 are lowered and raise the end of the vehicle off the ground the plunger will be allowed to return prior to the time the wheels 60 would begin to move the end of the car laterally. The strap 118 can be swung over to block the return of the plunger 93 and hold it in a halfway returned neutral position, and so hold the plunger 94 in advanced neutral position. After the tire was changed the strap 118 would be released so that both plungers could return, the plunger 94 closing circuit wires 101 and 102 to reverse the motors 23 and retract the jack screws 54 to original position.

Various methods of driving the jack screws could be employed.

It is to be understood that the drawings and descriptive matter are in all cases to be interpreted as merely illustrative of the principles of the invention rather than as limiting the same in any way since it is contemplated that various changes may be made in the various elements to achieve like results without departing from the spirit of the invention or the scope of the appended claims.

I claim:

1. A vehicle parking unit comprising; a housing; a tubular screw jack in said housing; a rotatable axially immobile nut receiving said screw jack; a shaft extending through and beyond the ends of said screw jack; an axle on the lower end of said shaft; a wheel on said axle; a key nonrotatably secured to the upper end of said shaft; the upper end of said jack having a recess to receive said key; a guide track secured in said housing and parallel to the axis of the screw receiving said key to prevent rotation of the key, shaft, and jack whereby these elements are lowered when said nut is rotated; said track terminating short of the upper and lower ends of the housing; a stop in the path of rotation of the key a spaced distance above the track such as to halt said key when it is above said track and revolves with the jack and shaft to a predetermined position; a withdrawable, spring returned, solenoid detent on said housing on the opposite side of said key from said stop for preventing rotation of said key and jack; gearing on the lower end of the jack connecting the latter with said wheel to drive said wheel about its axis; a projection on said jack below the key; stop means in the housing below the track for halting downward movement of said jack caused by preventing its rotation with said nut; a lug near the lower end of the track lifting said key out of said recess before the projection engages the stop means to free the jack for rotation with said nut to thereby drive said wheel; a reversible motor driving said nut; a circuit for said motor energizable to drive the nut in a direction to lower the jack and thereafter drive the wheel in a certain direction; a reversing circuit for said motor energizable to drive the nut in an opposite direction to raise said jack until the key is beyond the track and disposed against the first stop; a switch in said latter circuit engaged by the shaft at the top of its travel to break the reversing circuit; and means selectively energizing said first circuit also withdrawing said solenoid detent to permit rotation of said key, shaft, and screw through 180° to turn the wheel end for end.

2. The combination defined in claim 1 in which said solenoid detent has a cam surface on one side so that when said key strikes said surface in returning to said first stop it is retracted and passes said key.

3. The combination defined in claim 1 in which spring means on said shaft urges said key into engagement with said recess.

4. In a vehicle parking assembly; support means on the vehicle, at least one tubular screw jack on said support means, a shaft extending through said screw jack and journaled for rotation therein having a revolvable support wheel on the lower end thereof, means revolving said screw jack, means on said shaft normally in engagement with said jack, fixed track means engaging said latter means to prevent rotation of said jack and thereby lower the jack and shaft axially to raise the vehicle when the means revolving the screw jack is driven in a predetermined direction, means continuously drivingly connecting the wheel on said shaft with said jack so that the wheel is automatically driven on rotation of the jack when the wheel is in engagement with the ground, and means disengaging said jack from the said means on said shaft normally in engagement with said jack and preventing rotation thereof when the jack has lowered a predetermined distance to permit the jack to revolve and automatically drive the wheel.

5. In a vehicle parking assembly; support means on the vehicle, at least one tubular screw jack on said support means, a shaft extending through said screw jack and journaled for rotation therein having a revolvable support wheel on the lower end thereof, means revolving said screw jack, key means on said shaft prevented from rotation normally in engagement with said jack to prevent rotation of said jack and thereby lower the jack axially to raise the vehicle when the means revolving the screw jack is driven in a predetermined direction, means continuously drivingly connecting the wheel on said shaft with said jack so that the wheel is automatically driven on rotation of the jack when the wheel is in engagement with the ground, and means disengaging said jack from the said means on said shaft preventing rotation thereof when the jack has lowered a predetermined distance to permit the jack to revolve and automatically drive the wheel.

6. In a vehicle parking unit adapted to be supported on a vehicle, a support housing, a jack movable downwardly to raise the vehicle off at least one of its wheels, a reversible electric motor driving said jack and having a circuit for lowering said jack and a reversing circuit for raising the jack, a control adapted to be mounted on the dashboard of the vehicle comprising a pair of push members having contacts thereon, the contact on one of said members being in the motor circuit for lowering the jack and the contact for the other push member being in the reversing circuit for raising the jack, contacts in said control in the path of the contacts on said members so that one of the circuits is closed when the contact on one of said members engages a contact in its path; and a link connecting said push members to permit the reversing circuit to be opened when the first circuit is energized and to be energized when the push member closing the first circuit returns to original position to break the first circuit.

7. In a vehicle parking unit adapted to be supported on a vehicle, a support housing, a jack movable downwardly to raise the vehicle off at least one of its wheels, a reversible electric motor driving said jack and having a circuit for lowering said jack and a reversing circuit for raising the jack, a control adapted to be mounted on the dashboard of the vehicle comprising a pair of push members having contacts thereon, the contact on one of said members being in the motor circuit for lowering the jack and the contact for the other push member being in the reversing circuit for raising the jack; contacts in said control in the path of the contacts on said members so that one of the circuits is closed when the contact on one of said members engages a contact in its path; a link connecting said push members to permit the reversing circuit to be opened when the first circuit is energized and to be energized when the push member closing the first circuit returns to original position to break the first circuit; a drive whel provided on the lower end of said jack and gearing connecting said jack and wheel so that said wheel is driven about its axis by said jack; and a withdrawable solenoid plunger, normally holding said wheel in a particular position on said jack, in said reversing circuit and energized when the motor is reversed to release said plunger and permit orientation of the position of said wheel on the jack.

References Cited in the file of this patent

UNITED STATES PATENTS

| | | |
|---|---|---|
| 1,976,308 | Thomas | Oct. 9, 1934 |
| 2,162,257 | Hoecker | June 13, 1939 |
| 2,330,894 | Jezler | Oct. 5, 1943 |